(12) United States Patent
Kim

(10) Patent No.: US 10,500,534 B2
(45) Date of Patent: Dec. 10, 2019

(54) AIR PERMEABLE VENT FILTER, AND HEADLIGHT ASSEMBLY COMPRISING SAME

(71) Applicant: AMOGREENTECH CO., LTD., Gimpo-si (KR)

(72) Inventor: Kyung Su Kim, Bucheon-si (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 204 days.

(21) Appl. No.: 15/622,521

(22) Filed: Jun. 14, 2017

(65) Prior Publication Data

US 2017/0274315 A1   Sep. 28, 2017

Related U.S. Application Data

(62) Division of application No. PCT/KR2015/013888, filed on Dec. 17, 2015.

(30) Foreign Application Priority Data

Dec. 19, 2014   (KR) .................. 10-2014-0184816

(51) Int. Cl.
*B01D 46/00* (2006.01)
*B01D 46/54* (2006.01)
(Continued)

(52) U.S. Cl.
CPC ........... *B01D 46/546* (2013.01); *B01D 39/14* (2013.01); *B01D 39/1623* (2013.01);
(Continued)

(58) Field of Classification Search
CPC .. B01D 46/00; B01D 46/546; B01D 46/0036; B01D 46/528; B01D 46/0027;
(Continued)

(56) References Cited

U.S. PATENT DOCUMENTS 6,422,729 B1* 7/2002 Rohrbach ............. F21S 48/335
                                                        362/539
6,517,612 B1* 2/2003 Crouch ................. B01D 33/067
                                                        95/277
(Continued)

FOREIGN PATENT DOCUMENTS

KR   20020083734   11/2002
KR   20030047872    6/2003
(Continued)

OTHER PUBLICATIONS

International Search Report—PCT/KR2015/013888 dated Mar. 30, 2016.

*Primary Examiner* — T. Bennett McKenzie
(74) *Attorney, Agent, or Firm* — Cantor Colburn LLP

(57) ABSTRACT

Provided are an air permeable vent filter, and a headlight assembly comprising the same. The air permeable vent filter has a body in which a nanofiber web, which comprises a plurality of pores and is formed by accumulating a nanofiber electrospun from a spinning solution in which a polymer material and a solvent are mixed, is spirally wound, and the air permeable vent filter implements an air permeable filter function of allowing air to pass through from one lateral side of the body to the other lateral side and blocking liquids and solids.

10 Claims, 4 Drawing Sheets

(51) Int. Cl.
  *F21S 45/33*  (2018.01)
  *D04H 1/728*  (2012.01)
  *B01D 39/16*  (2006.01)
  *B01D 46/52*  (2006.01)
  *F21S 45/10*  (2018.01)
  *F21S 41/29*  (2018.01)
  *B01D 39/14*  (2006.01)

(52) U.S. Cl.
  CPC ..... *B01D 39/1684* (2013.01); *B01D 46/0036* (2013.01); *B01D 46/528* (2013.01); *D04H 1/728* (2013.01); *F21S 41/29* (2018.01); *F21S 45/10* (2018.01); *F21S 45/33* (2018.01); *B01D 46/003* (2013.01); *B01D 46/0005* (2013.01); *B01D 46/0023* (2013.01); *B01D 46/0027* (2013.01); *B01D 46/527* (2013.01); *B01D 2239/025* (2013.01); *B01D 2239/0631* (2013.01); *B01D 2275/20* (2013.01); *B01D 2279/35* (2013.01)

(58) Field of Classification Search
  CPC .............. B01D 46/003; B01D 46/0005; B01D 46/0023; B01D 46/527; B01D 39/00; B01D 39/14; B01D 39/1623; B01D 39/1684; B01D 2239/025; B01D 2239/0631; B01D 2279/35; B01D 2275/20; F21S 45/33; F21S 45/10; F21S 41/29; D04H 1/728
  USPC .......... 96/108; 362/218, 294, 345, 362–375, 362/546–548
  See application file for complete search history.

(56) References Cited

U.S. PATENT DOCUMENTS

| | | | |
|---|---|---|---|
| 2004/0182055 A1* | 9/2004 | Wynn | B01D 46/0001 55/497 |
| 2009/0268475 A1* | 10/2009 | Ball | F21V 29/83 362/373 |
| 2013/0197664 A1* | 8/2013 | Ballard | D04H 1/728 623/23.72 |

FOREIGN PATENT DOCUMENTS

| | | |
|---|---|---|
| KR | 20090114764 | 11/2009 |
| KR | 20100011608 | 2/2010 |
| KR | 20120002491 | 1/2012 |
| KR | 20140137908 | 12/2014 |

\* cited by examiner

AIR PERMEABLE VENT FILTER, AND HEADLIGHT ASSEMBLY COMPRISING SAME

CROSS-REFERENCE TO RELATED APPLICATION

This application is a divisional application of PCT Patent Application No. PCT/KR2015/013888 filed on Dec. 17, 2015, which claims priority to and the benefit of Korean Patent Application No. 10-2014-0184816 filed on Dec. 19, 2014, and the entire disclosures of which are incorporated herein by reference.

TECHNICAL FIELD

The present invention relates to an air permeable vent filter, and more particularly, to an air permeable vent filter which can be realized with a spirally wound nanofiber web to improve durability of the air permeable vent filter, and to remarkably lower breathability while revealing air permeability, and a headlight assembly having the same.

BACKGROUND ART

Generally, air permeability is imparted to living articles in contact with the human body in order to efficiently discharge the sweat generated from the human body at present and to optimize the activity.

In order to produce such an air permeable living article, a flat plate-shaped air permeable film is used. The air permeable film is a film which passes gas such as air and water vapor but does not allow liquid such as water to pass therethrough and is used as a cover for disposable diapers and disposable sanitary napkins, sportswear, and disposable garments such as disinfection clothing, waterproof clothing, architectural house wrap, packaging materials, and sanitary materials, in various purposes.

Recently, various attempts have been made to develop a component having more excellent air permeability in order to maintain the reliability of components in various fields such as electronic devices, automobiles, and aviation.

Korean Patent Application Publication No. 10-2002-0083734 discloses an air permeable film on which a nonwoven fabric is laminated, which is produced at a low cost, via a process of supplying and laminating the nonwoven fabric having a basis weight of less than 20 g/m$^2$ on one side of the air permeable film in a molten state of an extruded film while extruding an inorganic substance-containing resin for producing the air permeable film to a thickness of a basis weight of less than 20 g/m$^2$ in an extruder, and rolling a continuous laminated film of the nonwoven fabric in a rolling roll constituted of a local stretching roll and an elastic rubber roll in which a local elongation mark forming material is densely arranged to distribute fine pores around a local elongation mark in the air permeable film, and distribute the local elongation mark on a front surface of the air permeable film. In other words, the air permeable film has a simple constitution and process to impart air permeability to the laminated product, to simplify a manufacturing facility as well as significantly lower the basis weight of the laminated product of the nonwoven fabric and the air permeable film, to thereby provide the air permeable film laminated with the nonwoven fabric at a low cost. However, the air permeable film having a flat plate shape structure may be torn by the physical force, to thus have a drawback that durability is decreased.

DISCLOSURE

Technical Problem

The present invention has been made in view of the above problems, and it is an object of the present invention to provide an air permeable vent filter as a spirally wound nanofiber web to improve the durability of the air permeable vent filter, and to remarkably lower breathability while revealing air permeability, and a headlight assembly having the same.

It is another object of the present invention to provide an air permeable vent filter including a hygroscopic filter capable of minimizing breathability and a headlight assembly having the same.

It is a further object of the present invention to provide an air permeable vent filter and a headlight assembly having the same, in which an air permeable apparatus having a convenient assembly is inserted into an insertion hole of a support portion of the headlight assembly to discharge gas generated inside the headlight assembly to the outside, and supply fresh air from the outside to the inside of the headlight assembly, to thereby improve reliability of a lamp.

Technical Solution

According to an aspect of the present invention, there is provided an air permeable vent filter comprising: a body which is formed by spirally winding a nanofiber web which is formed by accumulating nanofibers that are obtained by electrospinning a spinning solution in which a polymer material and a solvent are mixed and the nanofiber web has a plurality of pores, whereby passing air from one side of the body to the other side thereof and blocking liquid and foreign matters.

In the air permeable vent filter according to an embodiment of the present invention, the body may be formed by spirally winding the nanofiber web at a state where an adhesive is laminated on the nanofiber web.

Here, the adhesive may be one of an epoxy resin, an acrylic resin, a urethane resin, a silicone resin, a phenol resin and a rubber-based adhesive, or a hot-melt web adhesive. The hot-melt web adhesive may be a web structure having multi-pores in which a fiber made of a hot-melt material is accumulated, and a structure of a non-pore state.

The air permeable vent filter according to an embodiment of the present invention may further include a hygroscopic filter having a hygroscopic agent absorbing moisture in the air.

The hygroscopic filter may include an air flow path for passing air in which a hygroscopic agent is placed along the air flow path, or may include: a flow path member in which an air flow path for passing air is formed; and a hygroscopic agent fixed on the surface or inside of the flow path member.

In addition, the hygroscopic filter may further include a guide member into which the flow path member is inserted, wherein the guide member may be a nanofiber web or a nonwoven fabric, and the flow path member may be one of a nonwoven fabric, a nanofiber web, and a nonwoven fabric laminated with a nanofiber web.

The hygroscopic filter may include a first flow path member; a hygroscopic agent powder applied to the first flow path member; and a second flow path member surrounding the hygroscopic agent powder and laminated on the first flow path member.

The air permeable vent filter according to an embodiment of the present invention may further include a tube surrounding the air permeable vent filter.

According to another aspect of the present invention, there is provided a headlight assembly comprising: a support having an insertion hole; an air permeable device inserted into the insertion hole; a lamp mounted on the support; and a protective transparent member that covers the lamp and transmits light emitted from the lamp and is fixed to the support, wherein the air permeable device comprises a body which is formed by spirally winding a nanofiber web which is formed by accumulating nanofibers that are obtained by electrospinning a spinning solution in which a polymer material and a solvent are mixed and the nanofiber web has a plurality of pores, or a body that is formed by spirally winding a nanofiber web at a state where an adhesive is laminated on the nanofiber web, and a tube surrounding the body.

The air permeable device of the headlight assembly further comprises a protective cap mounted on the tube, wherein the protective cap and the tube are spaced apart from each other, and a gap region between the protective cap and the tube may be used as an air layer in which external air is supplied into the body.

Advantageous Effects

According to the present invention, an air permeable vent filter composed of a spirally wound body of a nanofiber web is realized, so that a phenomenon of tearing the air permeable vent filter is much more reduced than that of a flat plate-shaped filter, to thus improve durability of the filter.

According to the present invention, a filter capable of performing an air permeable filter function of passing air from one side of an exposed body to the other side thereof and blocking liquid and solid is implemented, to thereby manifest the air permeability and remarkably lowering breathability, with a long air flow path.

According to the present invention, the air permeable vent filter including the hygroscopic filter for absorbing moisture contained in the air to be passed is realized, thereby minimizing the breathability.

According to the present invention, an air permeable apparatus having a convenient assembly is inserted into an insertion hole of a support portion of the headlight assembly to discharge gas generated inside the headlight assembly to the outside, and supply fresh air from the outside to the inside of the headlight assembly, to thereby improve reliability of a lamp.

BEST MODE

Hereinafter, embodiments of the present invention will be described in detail with reference to the accompanying drawings.

Figure 1:
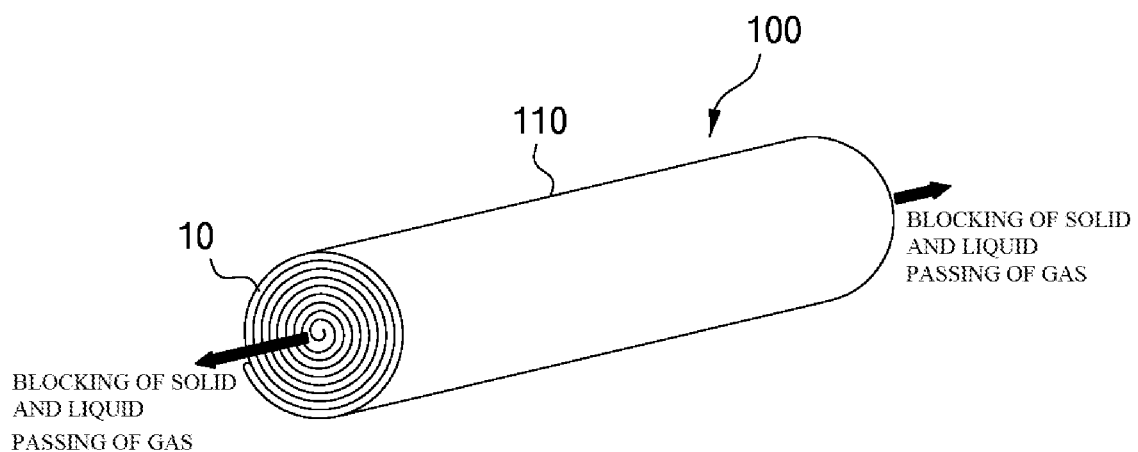
FIG. 1 is a conceptual perspective view of an air permeable vent filter according to a first embodiment of the present invention.

Referring to FIG. 1, an air permeable vent filter according to a first embodiment of the present invention, includes: a body which is formed by spirally winding a nanofiber web which is formed by accumulating nanofibers that are obtained by electrospinning a spinning solution in which a polymer material and a solvent are mixed and the nanofiber web has a plurality of pores, thereby implementing an air permeable filter function of passing air from one side of the body to the other side thereof and blocking liquid and solid.

The body 110 of the air permeable vent filter 100 is formed into a cylindrical shape by spirally winding the nanofiber web 10, and the spirally wound nanofiber web 10 is exposed on one side of the cylindrical body and the other side thereof. Accordingly, the air permeable vent filter 100 passes air from one side of the body 110 to the other side thereof to perform an air permeable filtering operation.

Here, a number of micro-pores formed between the nanofibers of the nanofiber web perform an air permeable filter function of passing air and blocking liquid and solid.

Here, it is preferable that the diameter of the nanofibers of the nanofiber web is 0.1 μm to 2 μm, the pore size thereof is 2 μm or less, and the porosity is set to 20% to 90%.

Here, the nanofiber web is formed by accumulating nanofibers that are formed by electrospinning a spinning solution that is formed by mixing a polymer material and a solvent. Here, a plurality of micro pores are formed by the accumulated nanofibers.

A polymer solution is formed by dissolving a polymer material in a solvent. The polymer material usable in the present invention is not particularly limited as long as it is a resin that can be dissolved in a solvent for electrospinning and is capable of forming nanofibers by electrospinning. For example, the polymer material may include: polyvinylidene fluoride (PVdF), poly (vinylidene fluoride-co-hexafluoropropylene), perfluoropolymers, polyvinyl chloride or polyvinylidene chloride, and co-polymers thereof; polyethylene glycol derivatives containing polyethylene glycol dialkylether and polyethylene glycol dialkyl ester; polyoxide containing poly (oxymethylene-oligo-oxyethylene), polyethylene oxide and polypropylene oxide; polyacrylonitrile co-polymers containing polyvinyl acetate, poly (vinyl pyrrolidone-vinyl acetate), polystyrene, polystyrene acrylonitrile co-polymers, polyacrylonitrile (PAN), and polyacrylonitrile methyl methacrylate co-polymers; and polymethyl methacrylate and polymethyl methacrylate co-polymers, and a mixture thereof.

The solvent may employ at least one selected from the group consisting of DMAc (N, N-dimethyl acetoamide), DMF (N, N-dimethylformamide), NMP (N-methyl-2-pyrrolidinone), DMSO (dimethyl sulfoxide), THF (tetra-hydrofuran), EC (ethylene carbonate), DEC (diethyl carbonate), DMC (dimethyl carbonate), EMC (ethyl methyl carbonate), PC (propylene carbonate), water, acetic acid, formic acid, chloroform, dichloromethane, acetone, and isopropylalchol.

As described above, the air permeable vent filter 100 according to the first embodiment of the present invention includes the body 110 formed by spirally winding the nanofiber web 10, so that a phenomenon of tearing the air permeable vent filter is much more reduced than that of a flat plate-shaped filter, to thus improve durability of the filter.

As described later, the air permeable vent filter 100 has an advantage that it can be easily and conveniently installed in a device requiring an air permeable filter.

Figure 2:
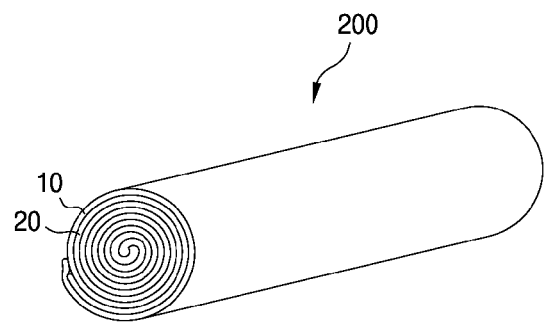
FIG. 2 is a conceptual perspective view of an air permeable vent filter according to a second embodiment of the present invention.

Referring to FIG. 2, an air permeable vent filter 200 according to a second embodiment of the present invention includes: a body which is formed by spirally winding a nanofiber web 10 which is formed by accumulating nanofibers that are obtained by electrospinning a spinning solution in which a polymer material and a solvent are mixed and the nanofiber web has a plurality of pores, at a state where an adhesive 20 is applied on the nanofiber web 10, thereby implementing an air permeable filter function of passing air from one side of the body to the other side thereof and blocking liquid and solid.

Here, the air permeable vent filter 200 according to the second embodiment of the present invention is formed of the body formed by spirally winding the nanofiber web 10 at a state where an adhesive 20 is applied on the nanofiber web 10. As a result, the adhesive 20 is present between neighboring nanofiber webs in a wound state of the nanofiber web 10.

Figure 3:
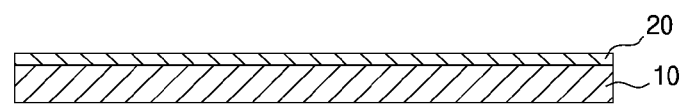
FIG. 3 is a cross-sectional view illustrating a pre-wind-up structure of the air permeable vent filter according to the second embodiment of the present invention.

That is, as shown in FIG. 3, the adhesive 20 is applied on the nanofiber web 10. The adhesive 20 may be any adhesive capable of bonding the nanofiber web 10 at the time of winding. Specifically, the adhesive 20 may be any one of an epoxy resin, an acrylic resin, a urethane resin, a silicone resin, a phenol resin and a rubber-based adhesive.

The adhesive 20 may be a hot-melt web adhesive of a web structure having a plurality of pores in which fibers made of a hot-melt material are accumulated, or a structure of a non-pore state. The hot-melt web adhesive may have a sheet shape of a solid state, and therefore, when the nanofiber web 10 is wound, a uniform adhesive force and excellent handling property can be obtained.

The hot melt web adhesive may be made of one of polyamide-based, polyester-based, polyurethane-based, polyolefin-based, and ethylene vinyl acetate (EVA)-based materials.

As described above, the neighboring nanofiber webs in the wound state, are not in contact with each other, and thus the air infiltrated into the air permeable vent filter 200 is restrained by and passes through the pores of the spiral-shaped nanofiber web. As a result, the air permeable vent filter 200 has a long air flow path.

Meanwhile, the water vapor impregnated into the air permeable vent filter 200 according to the second embodiment of the present invention flows through the long air flow path of the spiral-shaped nanofiber web, and the stay time in the air permeable vent filter 200 becomes longer, and thus is phase-changed into liquid by cooling in the relatively low-temperature air permeable vent filter 200. Therefore, the possibility that the water vapor permeated into the air permeable vent filter 200 according to the second embodiment of the present invention cannot escape to the outside increases. Therefore, the air permeable vent filter 200 according to the second embodiment of the present invention has a unique filter function that can reveal air permeability but lower moisture permeability.

Figure 4:
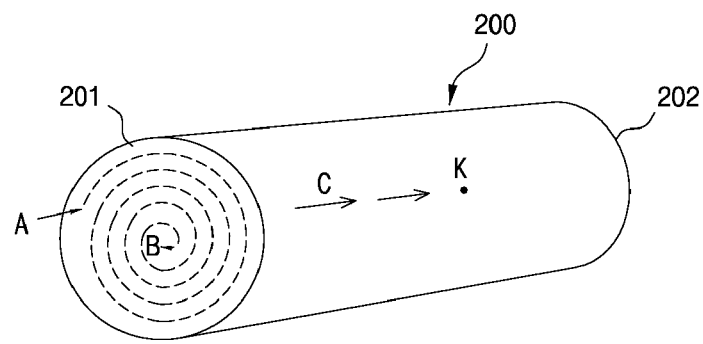
FIG. 4 is a conceptual view illustrating a flow path of water vapor infiltrated into the air permeable vent filter according to the second embodiment of the present invention.

That is, as shown in FIG. 4, the water vapor permeated in one direction 'A' of the air permeable vent filter 200 takes a longer time to stay in the air permeable vent filter 200, due to a long path C to pass from one side of the air permeable vent filter 200 to the other side thereof, along a path (from one direction 'A' to another direction 'B') flowing through the nanofiber web 201 arranged in a helical shape, and thus can be cooled inside the nanofiber web (at a point 'K'). Therefore, there is a high possibility that the water vapor cannot escape to the outside of the other side 202 of the air permeable vent filter 200.

Therefore, the air permeable vent filter 200 according to the second embodiment of the present invention is advantageous in that the moisture permeability can be remarkably lowered while air permeability can be revealed since the nanofiber web is wound in a spiral shape.

Figure 5:
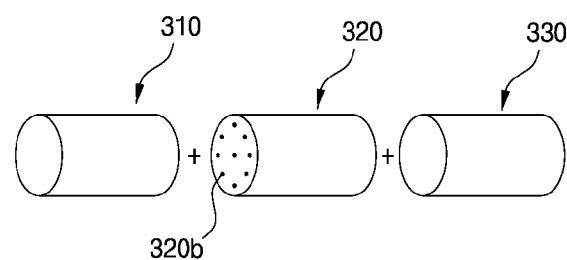
FIG. 5 is a conceptual perspective view of an air permeable vent filter according to a third embodiment of the present invention.
Figure 6:
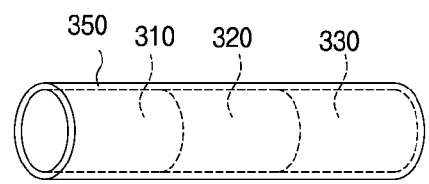
FIG. 6 is a perspective view illustrating an exemplary structure in which an air permeable vent filter including a hygroscopic filter shown in FIG. 5 is assembled.

FIG. 5 is a conceptual perspective view of an air permeable vent filter according to a third embodiment of the present invention, and FIG. 6 is a perspective view illustrating an exemplary structure in which an air permeable vent filter including a hygroscopic filter shown in FIG. 5 is assembled.

The air permeable vent filter according to the third embodiment of the present invention includes the air permeable vent filter according to the first embodiment or the air permeable vent filter according to the second embodiment and a hygroscopic filter 320.

In more detail, referring to FIG. 5, the air permeable vent filter according to the third embodiment of the present invention is configured so that a hygroscopic filter 320 including a hygroscopic agent 320b for absorbing moisture in the air is interposed and assembled between a pair of air permeable vent filters 310 and 330 such as the air permeable vent filter according to the first embodiment or the air permeable vent filter according to the second embodiment.

The hygroscopic agent 320b may be any substance having a function capable of adsorbing at least moisture, but a compound which adsorbs moisture chemically and maintains a solid state even when absorbing moisture is preferred. Examples of such compounds include metal oxides, inorganic acid salts of metals and organic acid salts.

The air permeable vent filter according to the third embodiment of the present invention has a filter structure capable of minimizing moisture permeability by absorbing moisture contained in the air to be passed through the hygroscopic filter 320.

Here, the hygroscopic filter 320 can be structured to smoothly fix the hygroscopic agent 320b while air passes smoothly. That is, the hygroscopic filter 320 has a structure in which a flow path for passing air is formed, and a hygroscopic agent 320b is positioned on the flow path.

Therefore, the air permeable vent filter according to the third embodiment of the present invention primarily filters liquid and solid by the micro pores of the nanofiber web, and secondarily absorbs the water vapor contained in the air by the hygroscopic agent 320b, to thereby have excellent moisture permeability while allowing air permeability.

In addition, referring to FIG. 6, the air permeable vent filter according to the third embodiment of the present invention may be configured so that the hygroscopic filter 320 is interposed between a pair of air permeable vent filters 310 and 330 such as the air permeable vent filter according to the first embodiment or the air permeable vent filter according to the second embodiment, and then the air permeable vent filter 310, the hygroscopic filter 320, and the air permeable vent filter 330 are surrounded by the nanofiber web 350 and are assembled with one another.

Figure 7:
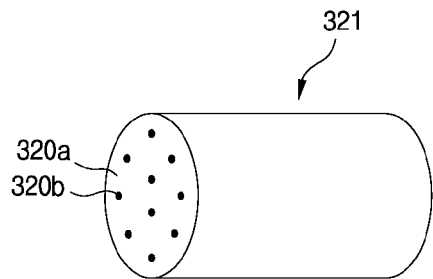
FIG. 7 is a conceptual perspective view showing a structure of an example of a hygroscopic filter included in the air permeable vent filter according to the third embodiment of the present invention.
Figure 8:
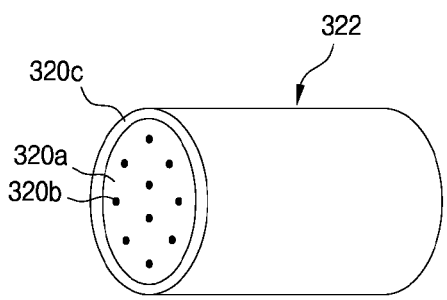
FIG. 8 is a conceptual perspective view showing a structure of a modified example of a hygroscopic filter included in the air permeable vent filter according to the third embodiment of the present invention.
Figure 9:
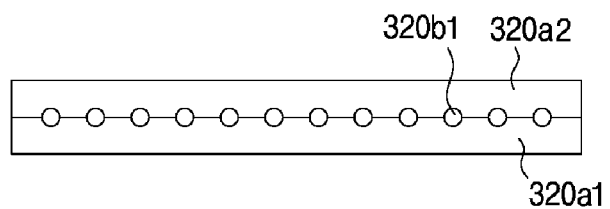
FIG. 9 is a cross-sectional view of an example of a hygroscopic filter according to the present invention.

FIG. 7 is a conceptual perspective view illustrating a structure of an example of a hygroscopic filter included in the air permeable vent filter according to the third embodiment of the present invention. FIG. 8 is a conceptual perspective view illustrating a structure of a modified example of the hygroscopic filter included in the air permeable vent filter according to the third embodiment of the present invention. FIG. 9 is a cross-sectional view of an example of the hygroscopic filter according to the present invention.

As shown in FIG. 7, the hygroscopic filter 321 includes a flow path member 320a in which an air flow path (not shown) is formed; and a hygroscopic agent 320b fixed to the flow path member 320a. Here, the hygroscopic agent 320b may be fixed onto the surface or inside of the flow path member 320a.

In addition, referring to FIG. 8, the hygroscopic filter 322 includes: a flow path member 320a in which an air flow path (not shown) is formed; a hygroscopic agent 320b fixed to the flow path member 320a; and a guide member 320c into which the flow path member 320a is inserted.

The guide member 320c is tubular and can be embodied as a nanofiber web or nonwoven fabric.

The flow path member 320a may use a nonwoven fabric having relatively larger pores than the nanofiber web in order to improve the air flow.

In addition, the flow path member 320a may be embodied as a nanofiber web or a nonwoven fabric laminated with a nanofiber web so as to have an air permeable filter function for passing air and blocking liquid and solid.

Therefore, in the present invention, one of the nonwoven fabric, the nanofiber web, and the nonwoven fabric laminated with the nanofiber web may be used as the flow path member 320a of the hygroscopic filter. In this case, the hygroscopic agent 320b may be interposed between the laminated flow path members.

That is, referring to FIG. 9, the hygroscopic filter includes: a first flow path member 320a1; hygroscopic agent powders 320b1 applied on the first flow path member 320a1; and a second flow path member 320a2 that surrounds the hygroscopic agent powders 320b1 and is laminated on the first flow path member 320a1.

Such a hygroscopic filter is obtained by spirally winding the first and second flow path members 320a1 and 320a2 with the hygroscopic agent powders 320b1 therebetween and is made to have the same size and shape as those of the air permeable vent filter according to the first embodiment or the air permeable vent filter according to the second embodiment, and then is assembled together with the air permeable vent filter according to the first embodiment or the air permeable vent filter according to the second embodiment.

Figure 10:
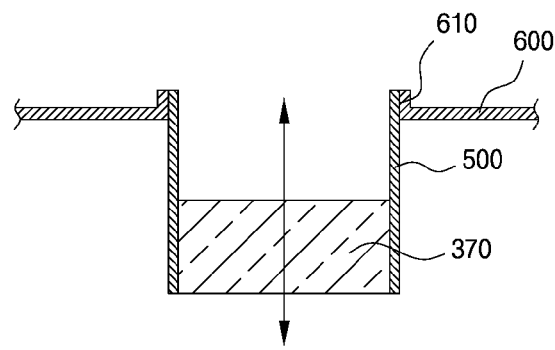
FIG. 10 is a partial cross-sectional view for explaining an air permeable device provided with an air permeable vent filter according to the present invention.
Figure 11:
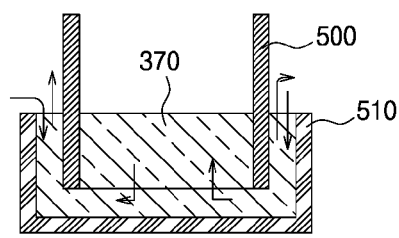
FIG. 11 is a cross-sectional view showing a state in which a protective cap is mounted on an air permeable device according to the present invention.
Figure 12:
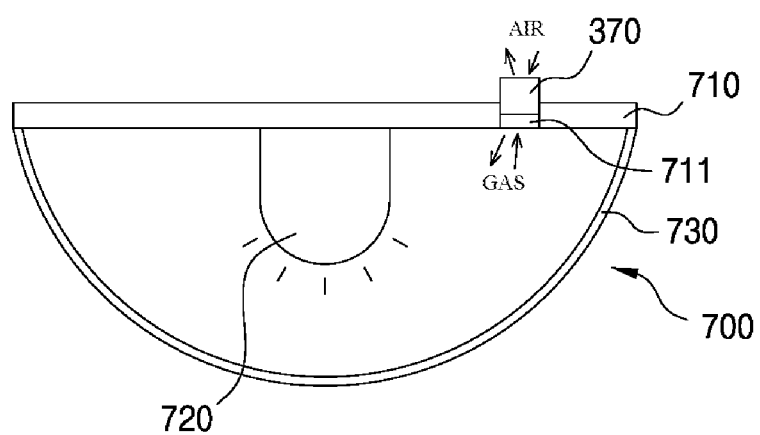
FIG. 12 is a conceptual cross-sectional view for explaining a headlight assembly having an air permeable device according to the present invention.

FIG. 10 is a partial cross-sectional view for explaining an air permeable device having an air permeable vent filter according to the present invention, FIG. 11 is a cross-sectional view showing a state where a protective cap is attached to the air permeable device according to the present invention, and FIG. 12 is a conceptual cross-sectional view illustrating a headlight assembly having an air permeable device according to an embodiment of the present invention.

Referring to FIG. 10, the air permeable device can be assembled by inserting an air permeable vent filter 370 into a tube 500 through which air flows. Such an air permeable device is mounted in an insertion hole 610 of an air permeable device 600 requiring air permeability such as a headlight assembly, and plays a role of allowing air to flow between the inside and the outside of the device 600, and preventing foreign matters from being penetrated into the device 600.

The air permeable device, which includes the tube 500 into which the air permeable vent filter 370 is inserted, may further include a protective cap mounted to be protected from external physical forces.

In other words, referring to FIG. 11, the protective cap 510 is mounted in the region of the tube 500 in which the air permeable vent filter 370 is inserted, and an air layer is provided between the protective cap 510 and the tube 500.

In this case, a protruding structure that is in close contact with the tube 500 is provided inside the protective cap 510, air flows through the protruding structure, and the air layer is formed between the protective cap 510 and the tube 500.

In other words, the protective cap 510 is mounted on the tube 500 and is spaced apart from the tube 500, and a gap region formed between the protective cap 510 and the tube 500 is used as an air layer through which the external is supplied to the body of the air permeable vent filter 370.

Referring to FIG. 12, the headlight assembly 700 includes: a support 710 having an insertion hole 711 formed therein; an air permeable device 370 inserted into the insertion hole 711; a lamp 720 mounted on the support 710; and a protective transparent member 730 that covers the lamp 720 and transmits light emitted from the lamp 720 and is fixed to the support 710.

In such a headlight assembly 700, power is applied to the lamp 720 to perform headlight illumination, and gas is generated inside the headlight by energy of light and heat according to illumination. If such gas is not appropriately discharged to the outside, adverse effects can be applied on the reliability of the lamp 720, such as shortening the lifetime due to deterioration and an operation failure.

Therefore, the air permeable device 370 according to the present invention is inserted into the insertion hole 711 of the support 710 of the headlight assembly 700 to discharge the gas generated inside the headlight assembly 700 from the inside of the headlight assembly 700 to the outside of the headlight assembly 700, and supply fresh air from the outside of the headlight assembly 700 to the inside of the headlight assembly 700, to thereby improve the reliability of the lamp 720.

Therefore, the air permeable device for performing air permeable filtering with the air permeable vent filter of the body formed by spirally winding the nanofiber web can be easily mounted in the headlight assembly of the present invention, to improve the durability of the headlight assembly as well as the filter.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention is applied to an air permeable vent filter which is implemented with a spirally wound nanofiber web thereby enhancing the durability of the filter and significantly lowering the moisture permeability while exhibiting air permeability.

What is claimed is:

1. An air permeable vent filter comprising:
a body formed of a spirally wound nanofiber web, the spirally wound nanofiber web being formed of electrospun and accumulated nanofibers, the electrospun and accumulated nanofibers being formed of a polymer material, and the spirally wound nanofiber web having a plurality of pores, whereby the body blocks liquid and foreign matters when air passes from one side of the body to the other side thereof; and
a hygroscopic filter disposed adjacent to the other side of the body, the hygroscopic filter including a flow path member and a hygroscopic agent, wherein the flow path member includes an air flow path through which the air flown from the other side of the body passes, and the hygroscopic agent is placed along the air flow path, whereby moisture in the air is absorbed by the hygroscopic agent,
wherein the flow path member comprises: a first flow path member; and a second flow path member, wherein the hygroscopic agent includes: a hygroscopic agent powder applied between the first flow path member and the second flow path member, and wherein the first flow path member and the second flow path member are spirally wound with the hygroscopic agent powder in-between to form the hygroscopic filter.

2. The air permeable vent filter of claim 1, wherein the body further includes: an adhesive adhering nanofiber webs in the spirally wound nanofiber web.

3. The air permeable vent filter of claim 2, wherein the adhesive is selected from the group consisting of an epoxy resin, an acrylic resin, a urethane resin, a silicone resin, a phenol resin and a rubber-based adhesive, and a hot-melt web adhesive.

4. The air permeable vent filter of claim 3, wherein the hot-melt web adhesive comprises a structure selected from the group consisting of a web structure having multi-pores in which a fiber made of a hot-melt material is accumulated, and a structure of a non-pore state.

5. The air permeable vent filter of claim 1, wherein the hygroscopic filter further includes: a guide member into which the flow path member is inserted.

6. The air permeable vent filter of claim 5, wherein the guide member selected from the group consisting of a nanofiber web and a nonwoven fabric.

7. The air permeable vent filter of claim 1, wherein the flow path member is one selected from the group consisting of a nonwoven fabric, a nanofiber web, and a nonwoven fabric laminated with a nanofiber web.

8. The air permeable vent filter of claim 1, further comprising: a tube surrounding the air permeable vent filter.

9. A headlight assembly comprising:
a support having an insertion hole;
an air permeable device inserted into the insertion hole, wherein the air permeable device comprises: a body formed of a spirally wound nanofiber web, the spirally wound nanofiber web being formed of electrospun and accumulated nanofibers, the electrospun and accumulated nanofibers being formed of a polymer material, and the spirally wound nanofiber web having a plurality of pores, whereby the body blocks liquid and foreign matters when air passes from one side of the body to the other side thereof; and a hygroscopic filter disposed adjacent to the other side of the body, the hygroscopic filter including a flow path member and a hygroscopic agent, wherein the flow path member includes an air flow path through which the air flown from the other side of the body passes, and the hygroscopic agent is placed along the air flow path, whereby moisture in the air is absorbed by the hygroscopic agent,
wherein the flow path member comprises: a first flow path member; and a second flow path member, wherein the hygroscopic agent includes: a hygroscopic agent powder applied between the first flow path member and the second flow path member, and wherein the first flow path member and the second flow path member are spirally wound with the hygroscopic agent powder in-between to form the hygroscopic filter;
a tube surrounding the air permeable device;
a lamp mounted on the support; and
a protective transparent member that covers the lamp and transmits light emitted from the lamp and is fixed to the support.

10. The headlight assembly of claim 9, wherein the air permeable device further comprises: a protective cap mounted on the tube, wherein the protective cap and the tube are spaced apart from each other, and a gap region between the protective cap and the tube is used as an air layer in which external air is supplied into the body.

* * * * *